US 6,543,749 B1

(12) United States Patent
Duvall

(10) Patent No.: US 6,543,749 B1
(45) Date of Patent: Apr. 8, 2003

(54) ROLLBACK WRECKER VEHICLE POSITIONING DEVICE

(76) Inventor: Carnel C. Duvall, P.O. Box 355 - 800 N. 8th St., Quinton, OK (US) 74561

( * ) Notice: Subject to any disclaimer, the term of this patent is extended or adjusted under 35 U.S.C. 154(b) by 0 days.

(21) Appl. No.: 10/150,732

(22) Filed: May 17, 2002

Related U.S. Application Data

(60) Provisional application No. 60/345,842, filed on Jan. 7, 2002.

(51) Int. Cl.[7] ................................................ B66D 1/00
(52) U.S. Cl. ........................ 254/323; 254/361; 414/478
(58) Field of Search ................................ 254/360, 361, 254/323

(56) References Cited

U.S. PATENT DOCUMENTS

| 3,633,775 | A | * | 1/1972 | Pugliese | ...................... | 414/476 |
|---|---|---|---|---|---|---|
| 3,788,605 | A | * | 1/1974 | Johnson | ........................ | 254/361 |
| 4,493,491 | A | * | 1/1985 | Karlik | ......................... | 280/402 |
| 4,726,566 | A | * | 2/1988 | Boland et al. | ............... | 254/325 |
| 5,509,639 | A | * | 4/1996 | Ellis | ........................... | 254/380 |
| 5,794,920 | A | * | 8/1998 | Kronberger | .................. | 254/361 |
| 6,138,991 | A | * | 10/2000 | Myers, Jr. | ..................... | 254/323 |
| 6,193,218 | B1 | * | 2/2001 | Philyaw | ...................... | 254/326 |
| 6,386,514 | B1 | * | 5/2002 | Ray | ............................ | 254/323 |
| 6,425,596 | B1 | * | 7/2002 | Foers | .......................... | 280/186 |
| 6,443,685 | B1 | * | 9/2002 | Maeno | ........................ | 414/563 |

* cited by examiner

*Primary Examiner*—Emmanuel Marcelo

(57) ABSTRACT

A vehicle positioning device that installs onto the side of the frame of a rollback wrecker vehicle and is capable of pulling a wrecked vehicle onto the shoulder of a roadway so that the wrecked vehicle is aligned parallel with the roadway, i.e. the desired position to be safely loaded onto the rollback wrecker vehicle. The device is provided with retractable stabilizing arms capable of stabilizing the rollback wrecker vehicle and with a winch and attached cable for pulling a wrecked vehicle in a direction approximately perpendicular to the longitudinal axis of the rollback wrecker vehicle. The arms and winch are hydraulically controlled by tapping into the hydraulic system provided on the rollback wrecker vehicle.

11 Claims, 7 Drawing Sheets

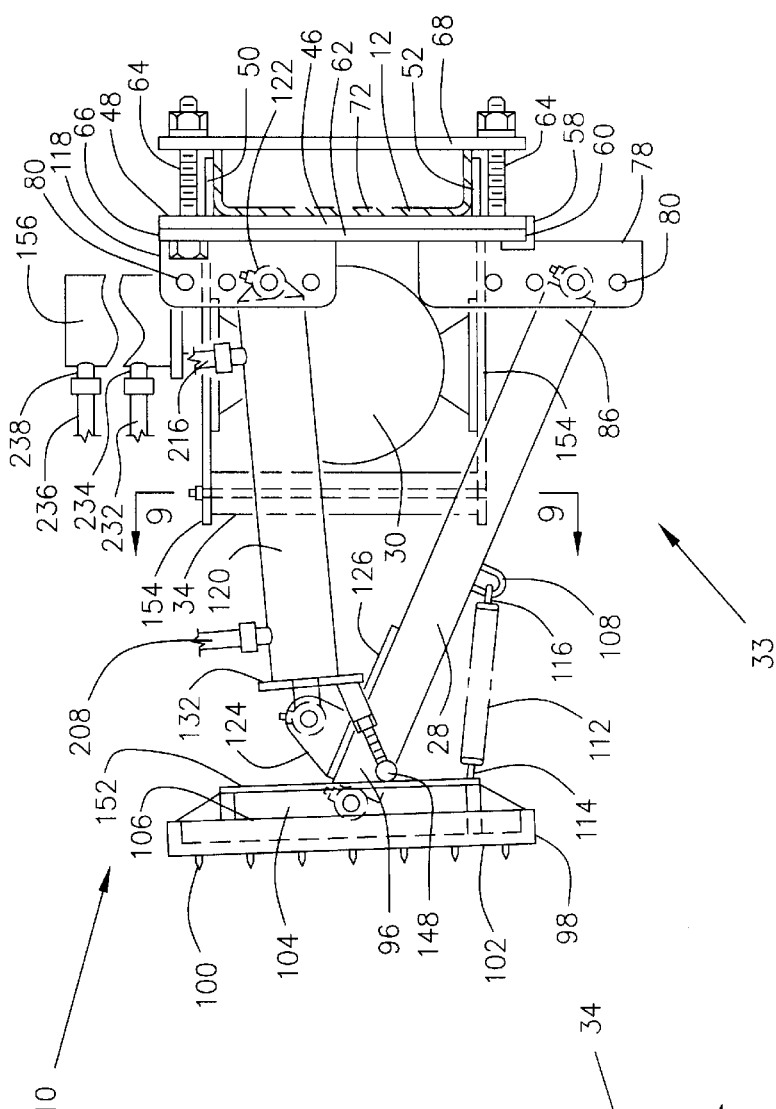
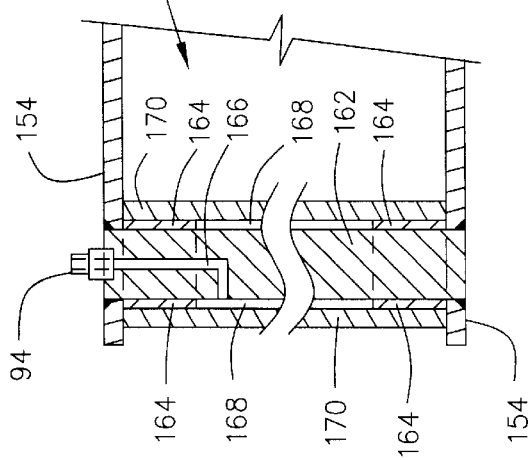
Fig. 5
Fig. 9

ROLLBACK WRECKER VEHICLE POSITIONING DEVICE

This application claims the benefit of Provisional application Ser. No. 60/345,842, filed Jan. 7, 2002.

BACKGROUND OF THE INVENTION

1. Field of the Invention

The present invention relates to a vehicle positioning device that installs on a rollback wrecker vehicle side frame directly behind the cab. This device is completely independent from the rollback wrecker bed and its functions.

This device is capable of moving a wrecked vehicle sideways from an awkward position on or off the roadway to a parallel position on the roadway shoulder for safe and convenient loading.

This device is provided with retractable stabilizing arms and feet with gripping capability to stabilize the rollback wrecker while winching from the side.

By employing a winch, cable and hook on the device, and chain with special attaching hooks, the device is capable of pulling a wrecked vehicle in a direction approximately perpendicular to the longitudinal axis of the rollback wrecker vehicle.

2. Description of the Related Art

Presently when a rollback wrecker is called to the scene of an accident, the vehicle is usually not in a good position for loading. The wrecker operator must first reposition the wrecked vehicle parallel with the roadway.

This repositioning may only require sliding the front or rear of the wrecked vehicle a few feet sideways to align it with the roadway, or at other times the wrecked vehicle may have been knocked 40 feet off the roadway and must be brought back to the roadway and positioned parallel with the roadway before loading.

Unlike conventional wrecker vehicles, rollback wreckers are flatbed car transport vehicles and are designed to load a vehicle onto the bed of the rollback wrecker by first positioning the rollback wrecker in front of the vehicle to be loaded and in parallel alignment therewith, second lowering the rollback wrecker bed to the roadway, third unwinding the cable from the winch mounted in the front of the bed, fourth connecting it to the vehicle, and finally winching the vehicle to the front of the bed. The wrecked vehicle is then secured with chains and the bed rolled forward for transport. Rollback wrecker beds are not designed to pull a vehicle at an angle to the longitudinal axis of the wrecker. Pulling a wrecked vehicle in a direction perpendicular to the longitudinal axis of the rollback wrecker can result in serious damage by warping the rollback bed.

For years operators have chained snatch blocks in the center of the top of the bed and pulled at 90 degrees and warped their rollback beds rather than returning to base for their conventional wrecker.

The current method of addressing this problem is installing a side puller socket and sheave in the center of the bed about three feet from the back. This has disastrous effects also by warping the rollback bed. Since rollback beds slide on rollers or rails, they warp very easily and are expensive to repair, especially if they are made of aluminum.

Side pullers consist of a socket that mounts permanently to the bed of a rollback wrecker vehicle and a sheave that connects and disconnects to the socket as needed. The sheave is connected to the socket when in use and the winch cable provided on the rollback wrecker is then placed around the sheave. By employing the side puller, the hook provided on the end of the cable can be attached to a wrecked vehicle and the rollback wrecker can then execute a side pull. This type of side pull hooked to the front or rear of a wrecked vehicle will generally pull the wrecked vehicle on the roadway at an angle.

Having a wrecked vehicle positioned at an angle to the roadway presents a problem when attempting to load the wrecked vehicle onto the rollback wrecker vehicle because the rollback wrecker vehicle must be aligned parallel and in front of the wrecked vehicle in order to successfully load the vehicle onto the bed of the rollback wrecker vehicle. If the wrecked vehicle is at an angle to the roadway, this requires the rollback wrecker vehicle to also position itself at an angle to the roadway in order to load the vehicle onto the bed of the rollback wrecker. The bed of a rollback wrecker is a minimum of seventeen feet long and usually has a combined truck and bed length of over thirty feet when in the transport position and several feet longer when in a loading position.

Anytime a rollback wrecker has both lanes of the roadway blocked you have a very dangerous situation. This is the reason some State Departments of Public Safety require that wrecker services must have a conventional wrecker also if they are to be on the Department of Public Safety wrecker rotation to work wrecks investigated by the Highway Patrol. Highway Patrol Officers like to keep at least one lane of the highway open to lower the danger risk and also for convenience. If the rollback wrecker vehicle is in the middle of the road with both lanes blocked during the loading process, oncoming traffic may strike the rollback wrecker, its operator, or the officer investigating the accident.

This can be particularly dangerous when the weather is bad, the roadway is slick or icy, the road is curved or hilly, or when visibility is poor, such as early morning, when foggy, or at night.

Because of dangers currently involved in loading a wrecked vehicle in an unfavorable position on a rollback wrecker traffic, authorities at the scene of an accident often insist that a conventional wrecker also respond to the accident to make the recovery and position the wrecked vehicle parallel with the roadway for loading so one lane of the highway can remain open for continuous traffic flow. This results in wasted time for the officer and operator, and higher costs for the customer.

The present invention allows a rollback wrecker vehicle to safely execute a side pull that will position the wrecked vehicle on the shoulder of the roadway and aligned parallel with the road so that it can be safely loaded onto the rollback wrecker vehicle. With the wrecked vehicle in this ideal position, the rollback wrecker can then be moved onto the shoulder of the road in front of the wrecked vehicle and out of the line of traffic. Next, the bed of the rollback wrecker vehicle is lowered to the roadway, and the wrecked vehicle can then be pulled straight ahead onto the bed of the rollback wrecker vehicle. Once the wrecked vehicle is loaded, it is secured with chains, the bed of the rollback wrecker vehicle is moved forward, and the wrecked vehicle is ready for transport.

This invention is designed for safety and convenience. One object of the invention is to slide the front or rear of a wrecked vehicle a few feet for ideal loading. The present invention is able to do the job safely without damage to the rollback wrecker bed at the scene instead of calling for another truck to assist. Another object of the invention is to align the wrecked vehicle with the roadway as it is being pulled sideways toward the side of the rollback wrecker.

This invention is, as the name applies, a rollback wrecker vehicle positioning device, and it does cure the one fault of the rollback wrecker: its length.

SUMMARY OF THE INVENTION

The present invention is a vehicle positioning device that installs onto the side of the frame of a rollback wrecker just behind the cab of the vehicle.

The device is capable of exerting a side pull to a wrecked vehicle to pull the wrecked vehicle sideways onto the shoulder of the roadway so that the wrecked vehicle is aligned parallel with the roadway. This is the desired position for the wrecked vehicle to allow it to be safely loaded onto the rollback wrecker vehicle with the wrecker vehicle positioned on the shoulder in front of the wrecked vehicle.

The device is provided with a pair of retractable stabilizing arms with attached feet with gripping ability to apply pressure down on the feet and up on the wrecker vehicle, thereby making the rollback wrecker vehicle stable enough to withstand a side pull.

By employing a winch, attached cable with hook on the device and a chain with special attaching hooks, the device is capable of pulling a wrecked vehicle in a direction approximately perpendicular to the longitudinal axis of the rollback wrecker vehicle. When the wrecker vehicle needs to be moved, the stabilizing arms can be disengaged from the roadway by retracting them upward. The wrecker vehicle can be driven when the arms are in a retracted position.

BRIEF DESCRIPTION OF THE DRAWINGS

FIG. 5 is a front view of the vehicle positioning device of FIG. 5 shown in it retracted position.

FIG. 8 is an enlarged view of the detail of a shaft pin and lock clip employed to pivotally secure the hydraulic cylinder to the arm.

FIG. 9 is a cross sectional view taken along line 9—9 of FIG. 5.

DETAILED DESCRIPTION OF THE PREFERRED EMBODIMENT THE INVENTION

Figure 1:
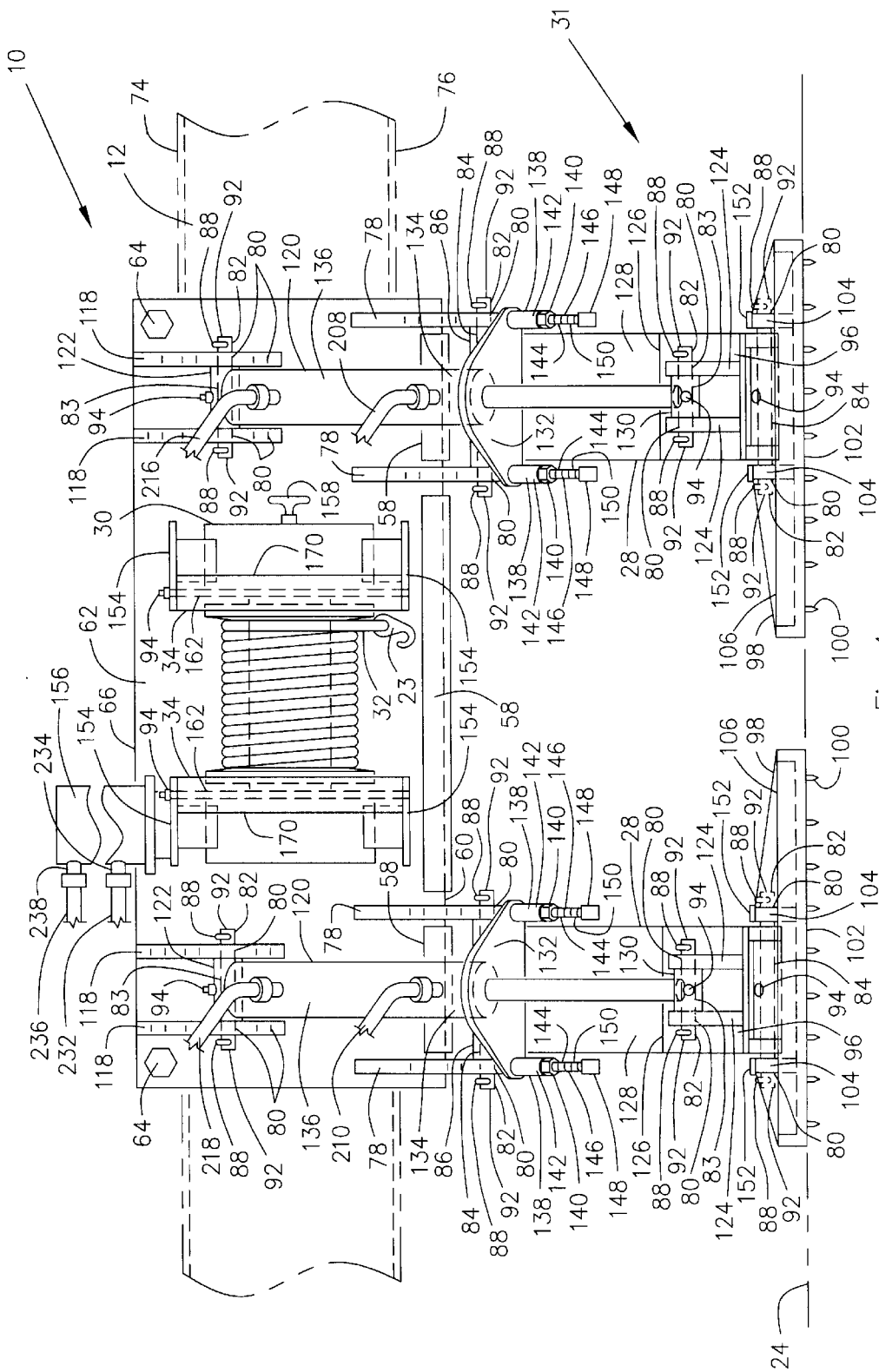
FIG. 1 is an outwardly facing side view of a vehicle positioning device shown installed onto the side of the frame of a rollback wrecker vehicle and deployed in its in use position with its arms extended and its feet pushed down against the roadway.
Figure 2:
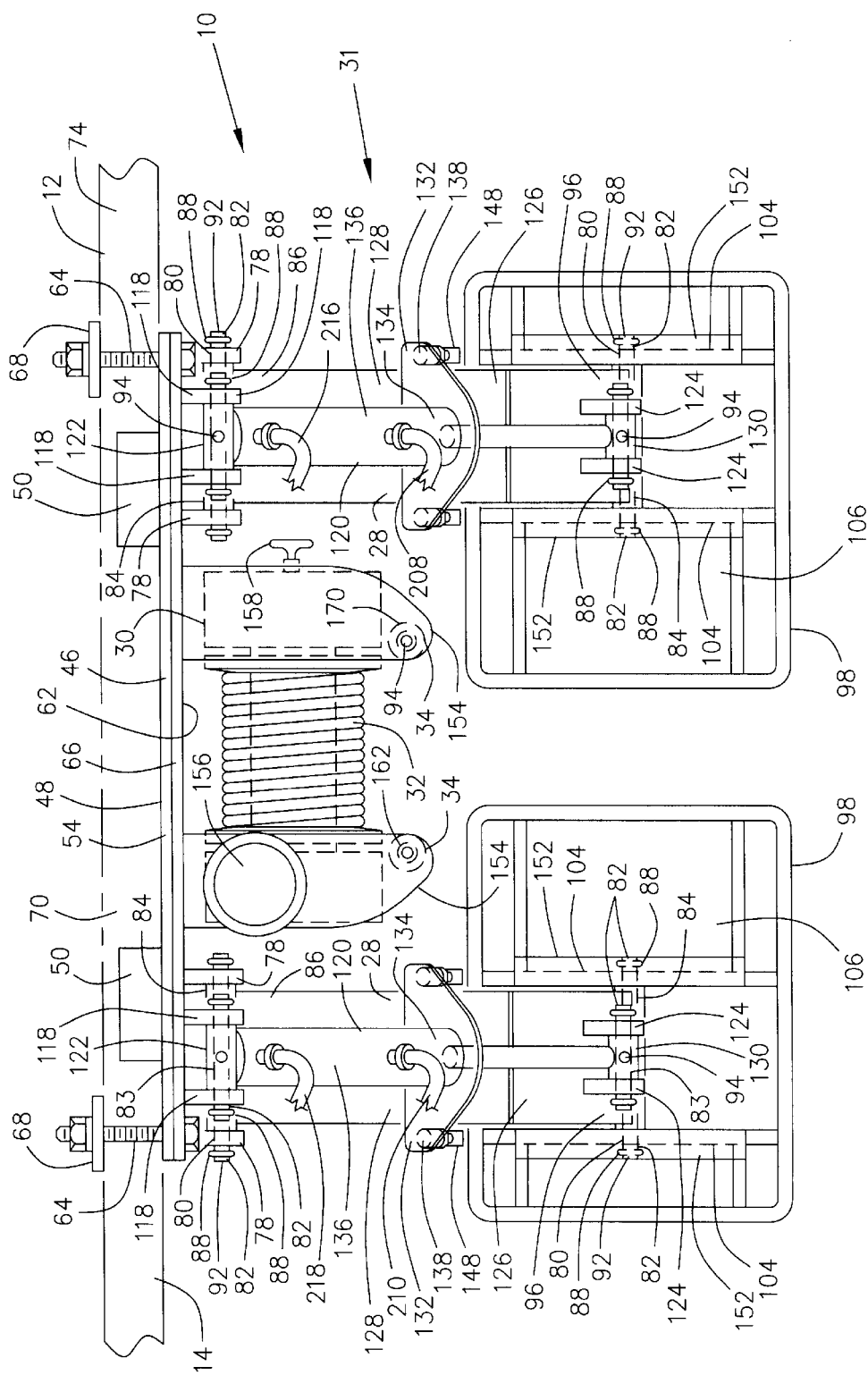
FIG. 2 is a top plan view of the vehicle positioning device of FIG. 1.
Figure 3:
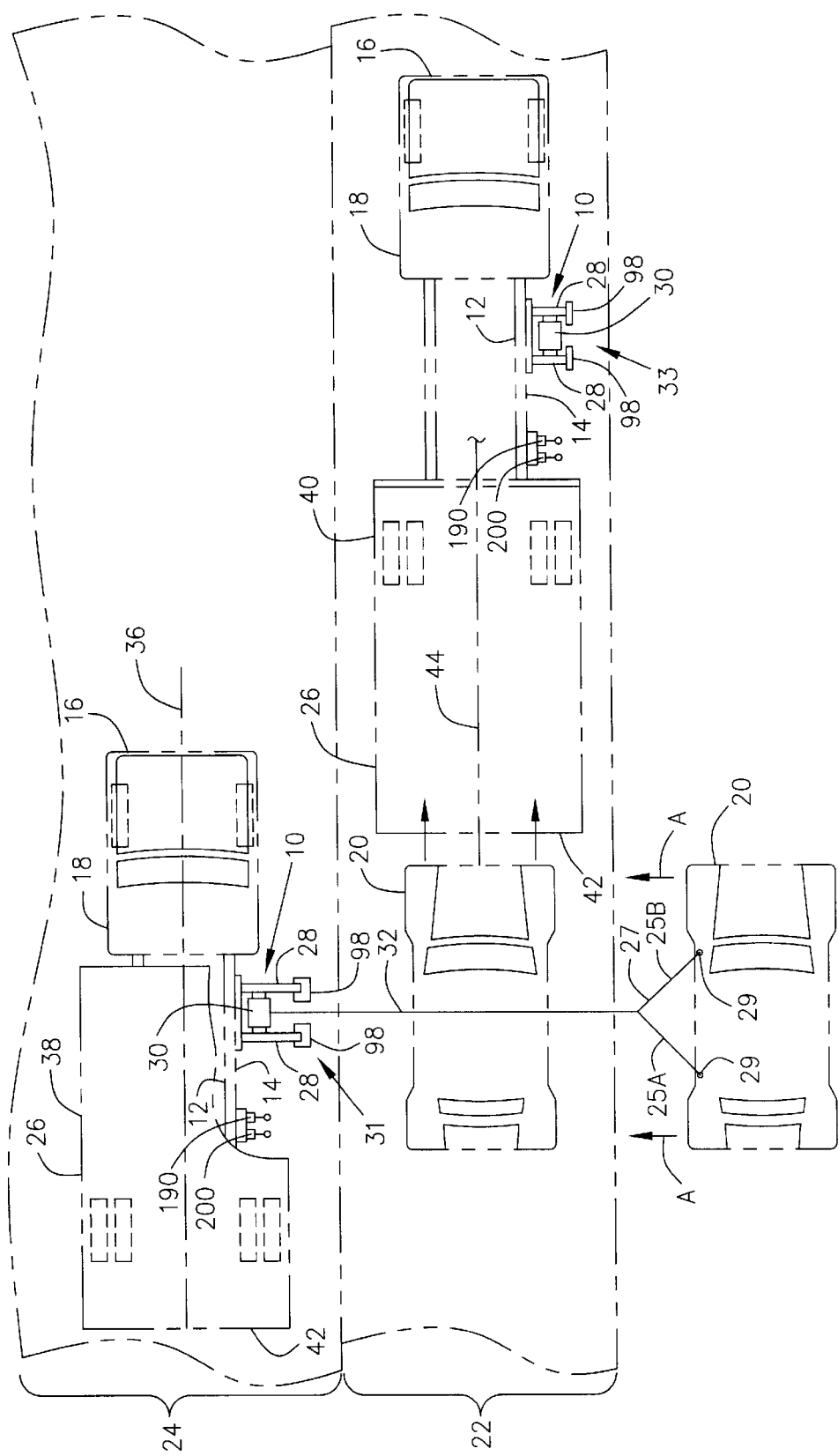
FIG. 3 is a diagram showing the vehicle positioning device being used by a rollback wrecker vehicle to pull a wrecked vehicle onto the shoulder of a roadway where it can be loaded by the rollback wrecker vehicle after the rollback wrecker vehicle has been moved in front of the repositioned wrecked vehicle.

Referring now to the drawings and initially to FIGS. 1 and 2, there is illustrated a vehicle positioning device 10 constructed in accordance with a preferred embodiment of the present invention. As illustrated also in FIG. 3, the device 10 installs onto the frame 12 of a rollback wrecker vehicle 16 at the side 14 of a rollback wrecker vehicle 16 just behind the cab 18 of the rollback wrecker vehicle 16.

Figure 4:
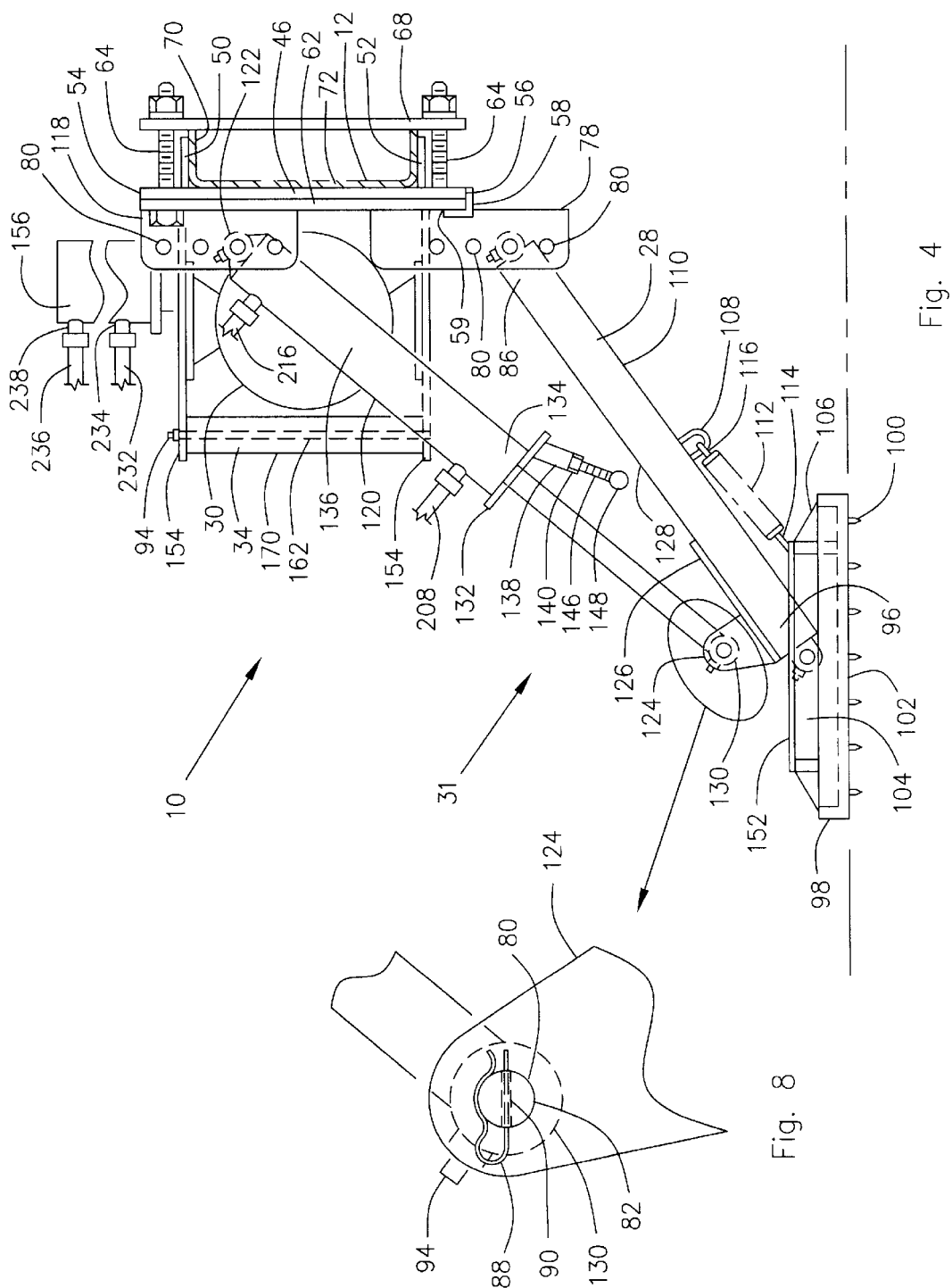
FIG. 4 is a front view of the vehicle positioning device of FIG. 1.

The device 10 is capable of pulling a wrecked vehicle 20 onto a shoulder 22 of a roadway 24 so that the wrecked vehicle 20 is aligned parallel with the roadway 24 and is in the desired position to be safely loaded onto the bed 26 of the rollback wrecker vehicle 16. This is done by first parking the rollback wrecker vehicle 16 in the roadway 24 adjacent the shoulder 22 of the roadway 24. Next, retractable arms 28 of the device 10 are extended to their in use position 31, as illustrated in FIGS. 1, 2, and 4. Then, opposite ends 25A and 25B of a chain 27 are attached to tie down holes 29 provided in the frame or uni-body of the wrecked vehicle 20. A cable 32 from a winch 30 provided on the device 10 is then attached to the chain 27 so that the cable 32 attaches midway between the two ends 25A and 25B of the chain 27. The cable 32 is provided with a hook 23 to facilitate attaching the cable 32 to the chain 27.

Next, the cable 32 is rewound on the winch 30, thereby pulling the wrecked vehicle 20 toward the rollback wrecker vehicle 16. As the wrecked vehicle 20 is pulled, it will automatically align itself parallel with the roadway 24. The winch 30 continues to rewind the cable 32 around the winch 30 until the wrecked vehicle 20 is pulled onto the shoulder 22 of the roadway 24. Once the wrecked vehicle 20 is on the shoulder 22 of the roadway 24, the cable 32 and chain 27 are removed from the wrecked vehicle 20.

The cable 32 is then completely rewound onto the winch 30, and the arms 28 of the device 10 are lifted upward off of the roadway 24 to a retracted position 33, as illustrated in FIG. 5. Next the rollback wrecker vehicle 16 is moved onto the shoulder 22 in front of the wrecked vehicle 20, and the bed 26 of the rollback wrecker vehicle 16 is lowered from its transport position 38 to its loading position 40 where the rear end 42 of the bed 26 rests on the shoulder 22. The wrecked vehicle 20 is then pulled up onto the bed 26 by a winch cable 44 provided on the rollback wrecker vehicle 16, and finally the bed 26 is raised back to its transport position 38.

Referring now to FIGS. 1, 2, 4 and 5, the device 10 is provided with retractable stabilizing arms 28 and feet 98 with gripping ability which, when powered to the roadway 24, lift the side 14 of the rollback wrecker vehicle 16 up a few inches. This applies downward pressure on the feet 98 for stability while leaving all of the tires of the rollback wrecker vehicle 16 in contact with the roadway 24 to add friction which increases winch 30 capability. With the side 14 of the rollback wrecker vehicle 16 lifted a few inches, the rollback wrecker vehicle 16 can withstand a side pull being exerted on a wrecked vehicle 20 employing the winch 30 and attached cable 32 provided on the device 10. As previously described and illustrated in FIG. 3, the winch 30 pulls a wrecked vehicle 20 in a direction, as indicated by arrows A in FIG. 3, that is approximately perpendicular to the longitudinal axis 36 of the rollback wrecker vehicle 16.

Referring now to FIG. 4, the device is shown attached to the frame 12 of the rollback wrecker vehicle 16. When the rollback wrecker vehicle 16 is manufactured, the frame 12 is a standard length which is too short to accommodate the longer bed 26 needed for this type of vehicle. After purchasing the truck, it is delivered to a rollback wrecker bed sales company where the truck frame 12 is cut and extended to the right length to accommodate the rollback bed 26. This is done by cutting each of the frame members 12 just behind the cab 18 and then welding a new segment of frame extension between the two associated cut pieces of each frame member 12. Then another smaller size metal frame which is longer than the newly added sections is positioned inside the original frame, and the newly added sections are bolted to the original frame 12 and to the newly added section for added strength and safety.

The result of this modification is that the frame 12 for the rollback wrecker vehicle 16 in the area just behind the cab 18 is not smooth since it has two welds on each side and several bolt heads where the frame 12 and its frame extension have been secured together. In order to have a smooth outside facing surface on the frame 12 at the side 14 of the rollback wrecker vehicle 16 to which the device 10 can be secured, it is necessary to create and secure to the frame 12 an adaptor plate 46 in the area behind the cab 18 where the device 10 is to be secured to the frame 12. The adaptor plate 46 is provided with cut out sections coinciding with bolt heads that are holding the extended frame 12 together, thus creating a smooth, flat surface on the frame 12 at the side 14 of the rollback wrecker vehicle 16 just behind the cab 18.

The adaptor plate 46 is provided on its interior side 48 with upper push straps 50 and lower push straps 52 which are provided near the upper edge 54 and lower edge 56 respectively of the adaptor plate 46. These push straps 50 and 52 are spaced apart so that they receive there between and tightly hug the frame 12 of the rollback wrecker vehicle 16 when the device 10 is secured to the frame 12. The lower edge 56 of the adaptor plate 46 is provided with sections of angle iron 58 secured thereto. The sections of angle iron 58 form a groove 59 for receiving a bottom edge 60 of a base plate 62.

The bottom edge 60 of the base plate 62 inserts into the groove 59 formed between the angle iron 58 and the adaptor plate 46. The base plate 62 is bolted onto the frame 12 by bolts 64 that attach to the base plate 62 near its top and bottom edges 66 and 60. These bolts 64 next insert through bolt openings provided near the upper and lower edges 54 and 56 of the adaptor plate 46, around the upper and lower push straps or bars 50 and 52, and around the frame member 12 to finally secure through clamp bars 68 provided adjacent inwardly extending lips 70 of the frame 12 in order to secure the device 10 to the frame 12. The clamp bars 68 extend vertically on the inwardly facing side 72 of the frame 12 and are engaged by at least one bolt 64 on a top side 74 of the frame 12 and at least one bolt 64 on the opposite bottom side 76 of the frame 12, thereby capturing the frame 12 there between.

The purpose of the upper and lower push bars 50 and 52 is to keep the device 10 stable relative to the frame 12 when the device 10 is in use and also to take pressure off of the bolts 64. When the bolts 64 are thus secured, the adaptor plate 46 is sandwiched between the base plate 62 and the frame member 12 and the frame 12 is sandwiched between the clamp bars 68 and the adaptor plate 46.

The base plate 62 serves as the surface on which the two retractable arms 28 and the winch 30 are secured. In the case of the alternate embodiment 10A, the second alternate winch 30A is also secured to the base plate 62.

Four lower lift arm brackets 78 are secured to the base plate 62 near the bottom edge 60 of the base plate 62 and spaced apart so as to form two sets of lower lift arm brackets 78 by which the two arms 28 will attach to the base plate 62. Each set of lower lift arm brackets 78 is provided with horizontally aligned sets of shaft openings 80. One retractable arm 28 is pivotally secured between each set of lower lift arm brackets 78 by means of a shaft pin 82 that inserts through a brass bushing 84 provided in an upper end 86 of each arm 28 and also inserts through one set of the horizontally aligned shaft openings 80 provided in the associated set of lower lift arm brackets 78.

As illustrated in FIG. 8, lock clips 88 insert into openings 90 provided on both ends 92 of each of the shaft pins 82 to secure the shaft pins 82 within the brass bushing 84 of the upper ends 86 of the arms 28 and within the shaft openings 80 provided in the lower lift arm brackets 78. Grease fittings 94 are associated with each of the brass bushings 84 and openings 83 of the device 10 as a means of lubricating the shaft pins 82 and brass bushings 84 or openings 83, as best illustrated in FIG. 9 for the grease fitting 94 associated with a cable roller guide 34.

Lower ends 96 of the arms 28 are also each provided with a brass bushing 84 where a foot 98 attaches. Each foot 98 is provided with teeth 100 on a lower side 102 of the foot 98 in order to grip the roadway 24 when the arms 28 are extended to their in use position 31, as illustrated in FIGS. 14.

Each foot 98 is also provided with a pair of foot attaching bars 104 on an opposite upper side 106 of the foot 98. Each pair of foot attaching bars 104 is provided with a set of horizontally aligned shaft openings 80 extending there through. In order to secure a foot 98 to a lower end 96 of each arm 28, the lower end 96 of each the retractable arms 28 is pivotally secured between a corresponding set of foot attaching bars 104 by means of a shaft pin 82 that inserts through a brass bushing 84 provided in the lower end 96 of each arm 28 and also inserts through the set of horizontally aligned shaft openings 80 provided in the foot attaching bars 104. Lock clips 88 insert into openings 90 provided on both ends 92 of each of the shaft pins 82 to secure the shaft pins 82 within the brass bushings 84 of the lower ends 96 of the arms 28 and within the shaft openings 80 provided in the foot attaching bars 104.

A spring anchor 108 is provided near the lower end of each arm 28 on the underside 110 of the arm 28 and also an associated spring anchor 108 is provided on each foot 98. A spring 112 attaches by one end 114 of the spring 112 to the spring anchor 108 of one foot 98 and an opposite end 116 of the spring 112 attaches to the spring anchor 108 of the associated arm 28 to thereby bias the foot 98 toward the underside 110 of the arm 28. Both feet 98 must be biases toward the underside 110 of the arm 28 to allow the feet 98 to engage the roadway 24 in proper orientation when the arms 28 are moved to their in use position 31.

Four upper cylinder brackets 118 are secured to the base plate 62 near the top edge 66 of the base plate 62 and are spaced apart so as to form two sets of upper cylinder brackets 118 where two hydraulic cylinders 120 will attach to the base plate 62. Each set of upper cylinder brackets 118 is provided with horizontally aligned sets of shaft openings 80. An upper end 122 of one of the hydraulic cylinders 120 is pivotally secured between each set of upper cylinder brackets 118 by means of a shaft pin 82 that inserts through an opening 83 provided in the upper end 122 of each hydraulic cylinder 120 and also inserts through one set of horizontally aligned shaft openings 80 provided in the corresponding set of upper cylinder brackets 118. Lock clips 88 insert into openings 90 provided on both ends 92 of each of the shaft pins 82 to secure the shaft pins 82 within the openings 83 of the upper ends 122 of the hydraulic cylinder 120 and within the horizontally aligned shaft openings 80 of the upper cylinder brackets 118.

Four lower cylinder brackets 124 are secured to a pressure plate 126 which is provided on a top side 128 of each arm 28 near the lower end 96 of the arm 28 and are spaced apart so as to form two sets of lower cylinder brackets 124 where the two hydraulic cylinders 120 will attach to the arms 28. Each set of lower cylinder brackets 124 is provided with horizontally aligned sets of shaft openings 80. A lower end 130 of one of the hydraulic cylinders 120 is pivotally secured between each set of lower cylinder brackets 124 by means of a shaft pin 82 that inserts through an opening 83 provided on a lower end 130 of each hydraulic cylinder 120 and also inserts through one set of horizontally aligned shaft openings 80 provided in the corresponding set of lower cylinder brackets 124. Lock clips 88 insert into openings 90 provided on both ends 92 of each of the shaft pins 82 to secure the shaft pins 82 within the opening 83 of the lower ends 130 of the hydraulic cylinder 120 and within the horizontally aligned shaft openings 80 of the lower cylinder brackets 124.

A foot parking base 132 is provided on a lower end 134 of the body 136 of each of the hydraulic cylinders 120. The foot parking base 132 is provided with a pair of pipe extension housings 138 secured thereto and extending outward toward their associated foot 98. A nut 140 is welded to a distal end 142 of each pipe extension housing 138. One end 144 of an all thread screw 146 adjustably engages the nut 140, and a bumper block 148 is provided on an opposite distal end 150 of the all thread screw 146. The purpose of the foot parking base 132 and the adjustably attached bumper blocks 148 is to move the feet 98 into a rigid parked position by pressuring the feet 98 against the pressure plate 126 to keep the feet 98 from flopping when the arms 28 are in a retracted position 33. As illustrated in FIG. 5, each of the bumper blocks 148 removably engages an associated striker plate 152 provided on the upper side 106 of the feet 98 when the arms 28 are in their retracted position 33 to assist in holding the feet 98 from flopping while the rollback wrecker vehicle 20 is traveling.

Winch mounting brackets 154 are provided on the base plate 62 winch so that the winch mounting brackets 154 are located between the arms 28. The winch 30 is secured to the device 10 via the winch mounting brackets 154. A winch motor 156 is operatively connected to the winch 30 so that the motor 156 can alternately operate the winch 30 to unwind the cable 32 from the winch 30 or rewind the cable 32 onto the winch 30. As illustrated in FIGS. 1 and 2, the winch 30 is also provided with a winch dog 158 that can be used to disengage the winch 30 from the motor 156 so that the winch 30 will free wheel, thus enabling the cable 32 to be rapidly unwound from the winch 30. The winch 30 is also provided with a pair of vertically oriented cable roller guides 160, one located on either side of the winch. The cable roller guides 160 serve to prevent the winch cable 32 from becoming tangled as it is unwound and rewound on the winch 30

Referring now to FIG. 9, details of the cable roller guides 160 are illustrated. Each cable roller guide 160 is provided with a roller support shaft 162 that is welded to the winch mounting brackets 154 so that each of the roller support shafts 162 remains stationery relative to the winch mounting brackets 154. Bushings 164 are provided encircling the roller support shafts 162 at each end of the roller support shafts 162. Each of the roller support shafts 162 is provided with a grease fitting 94 that communicates via a channel 166 provided in the roller support shaft 162 to a void space 168 within the cable roller guide 160. The void space 168 is formed between the roller support shaft 162 and a roller 170 that completely encircles the roller support shaft 162 and between the two bushings 164. The grease fittings 94 allow grease to be inserted into the void spaces 168 to serve as lubrication between the stationary roller support shafts 162 and their associated and freely rotatable eternal rollers 170. The rollers 170 rotate in response to contact with the cable 32 and thereby prevent the cable 32 from binding up when the cable 32 is unwound from or rewound onto the winch 30.

Figure 7:
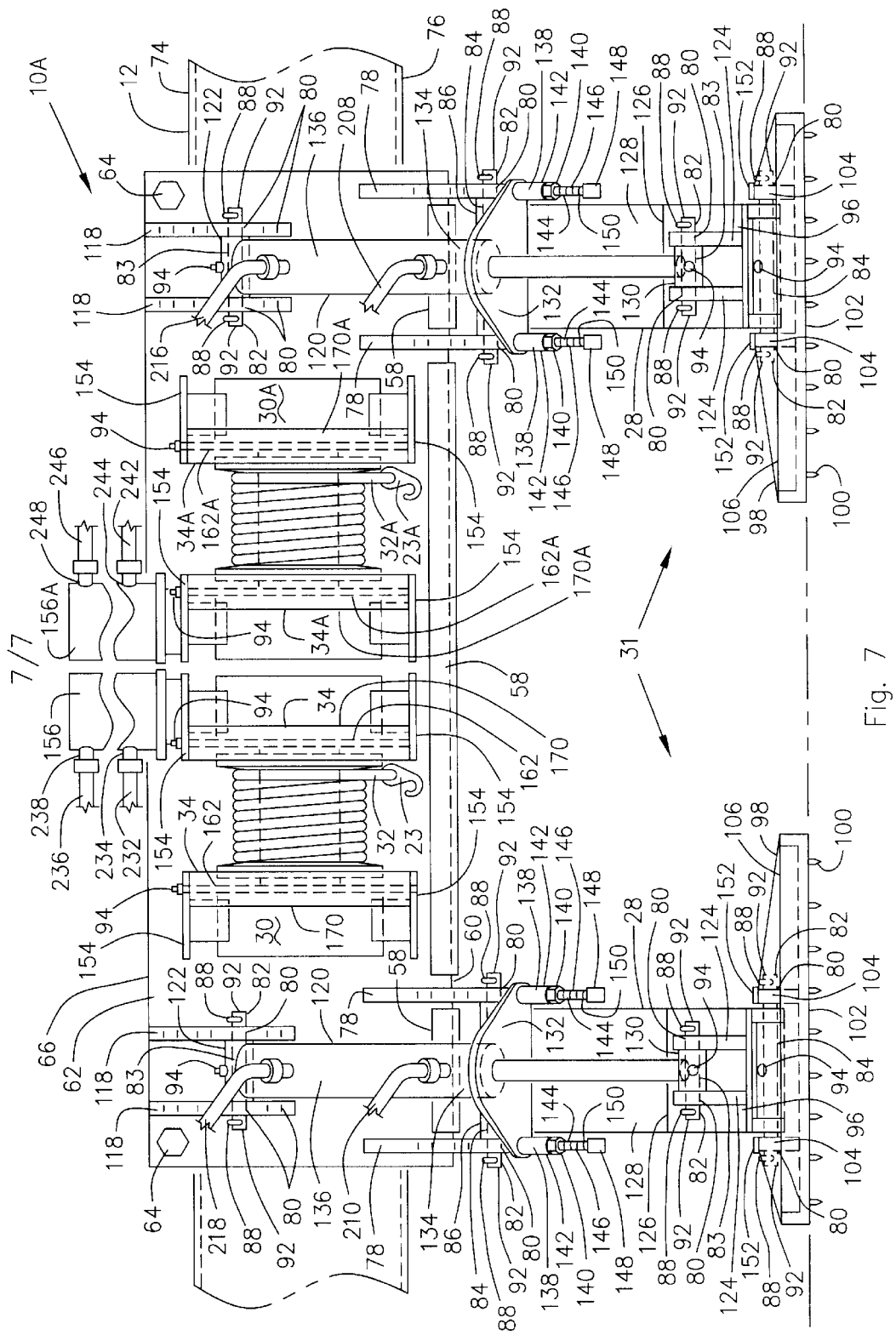
FIG. 7 is an outwardly facing side view of an alternate vehicle positioning device shown installed onto the side of the frame of a rollback wrecker vehicle and deployed in its in use position with its arms extended and its feet pushed down against the roadway.

Referring now to FIG. 7, the alternate or second embodiment of the device 10A is illustrated. The alternate embodiment 10A contains all of the features of the device 10 and includes one additional winch 30A, preferably located between the arms 28. The second winch 30A is secured to the base plate 62 of the alternate device 10A via additional winch mounting brackets 154. The additional winch 30A is provided with second cable 32A, second cable roller guides 34A, second winch motor 156A, second roller support shafts 162A, and second rollers 170A similar to those provided on the winch 30. The second cable 32A is also provided with a second hook 23A to facilitate attaching the second cable 32A to the chain 27.

Figure 6:
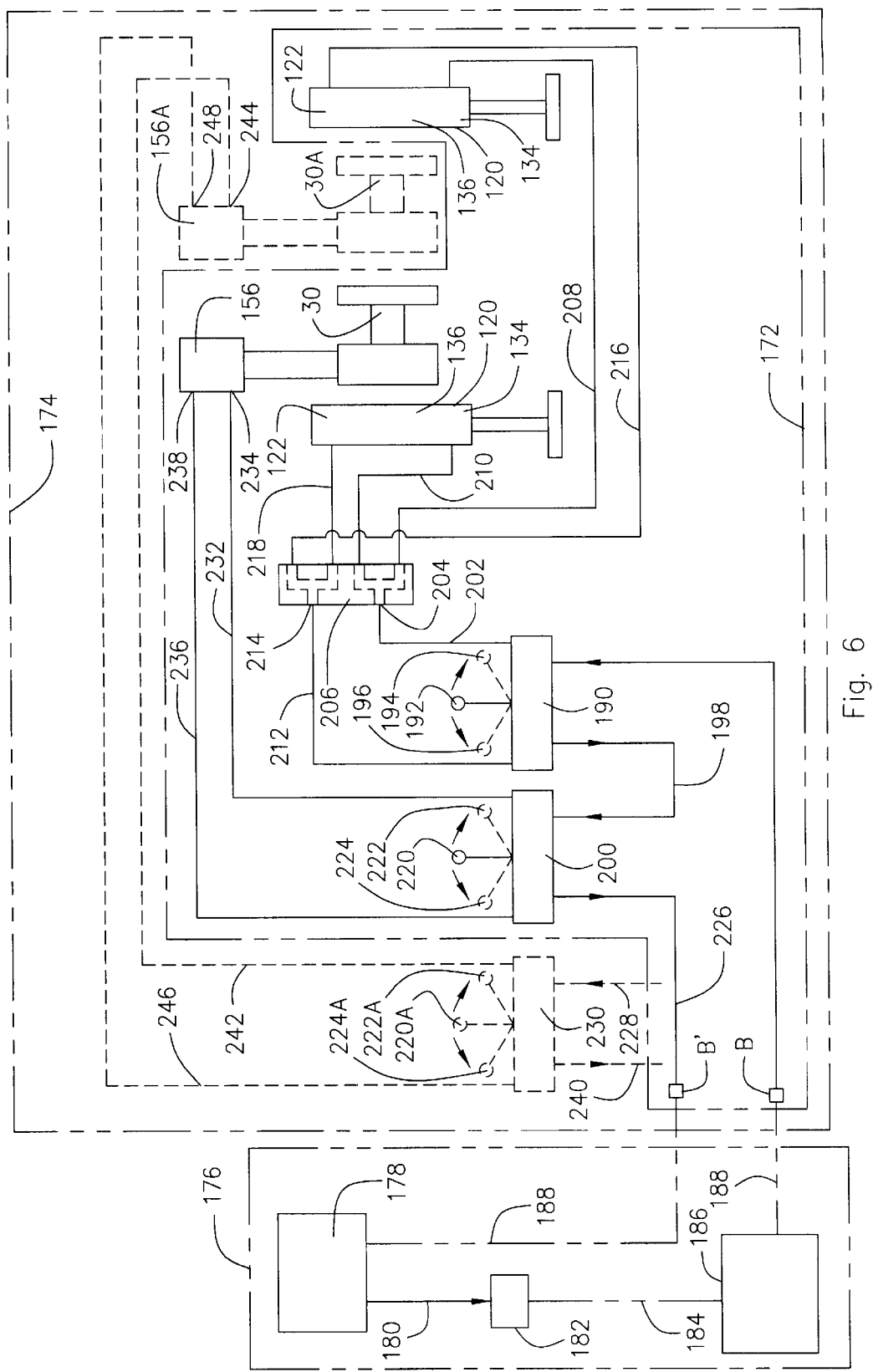
FIG. 6 is a diagram showing the hydraulic system of the vehicle positioning device attached to the hydraulic system provided on the rollback wrecker vehicle.

Referring now to FIG. 6, there is a diagram of the hydraulic system for the both the preferred embodiment of the present invention, i.e. device 10, and the alternate embodiment device 10A. The hydraulic system for the device 10 is shown within box 172 of FIG. 6. Box 174 of FIG. 6 contains the hydraulic system needed for an alternate device 10A and includes the contents of box 172 in addition to the hydraulic system for the second winch 30A. The hydraulic system for the rollback wrecker vehicle 16 is shown within box 176 of FIG. 6.

Referring now to the contents of box 176, the rollback wrecker vehicle 16 is provided with a hydraulic fluid tank, represented by box 178. Hydraulic line 180 transports hydraulic fluid from the hydraulic fluid tank 178 to a hydraulic pump, represented by box 182, which is also provided on the rollback wrecker vehicle 16. The hydraulic pump 182 forces hydraulic fluid via hydraulic line 184 to the hydraulic operating components, represented by box 186, which are provided on the rollback wrecker vehicle 16. A hydraulic line 188 normally returns the hydraulic fluid to the hydraulic fluid tank 178 from the hydraulic operating components 186. However, this hydraulic line 188 is cut in two at points B and B', as shown in FIG. 6. The hydraulic line 188 is then connected via points B and B' to the hydraulic system 172 of the device 10 or alternately to the hydraulic system 176 of the alternate device 10A, as will be more fully described hereafter.

Hydraulic line 188 is extended at point B to connect to a first hydraulic switch 190. The first hydraulic switch 190 has a neutral position 192, an up position 194, and a down position 196. When the first hydraulic switch 190 is in the neutral position 192, hydraulic fluid flows via line 198 from the first hydraulic switch 190 to a second hydraulic switch 200.

When the first hydraulic switch 190 is in the up position 194, hydraulic fluid flows via line 202 from the first switch 190 to a first port 204 on a junction fitting 206 and from there hydraulic fluid flows simultaneously via lines 208 and 210 to the lower end 134 of the body 136 of the hydraulic cylinders 120, causing the hydraulic cylinders 120 to shorten in length which lifts the arms 28 to their retracted position 33.

When the first hydraulic switch 190 is in the down position 196, hydraulic fluid flows via line 212 from the first hydraulic switch 190 to a second port 214 on the junction fitting 206 and from there hydraulic fluid flows simultaneously via lines 216 and 218 to the upper end 122 of the hydraulic cylinders 120, causing the hydraulic cylinders 120 to increase in length which pushes the arms 28 to their in use position 31.

The second hydraulic switch 200 has a neutral position 220, an out position 222, and an in position 224. In the neutral position 220, hydraulic fluid flows via line 226 from the second hydraulic switch 200 back to point B' and then from there back to the hydraulic fluid tank 178. When the second hydraulic switch 200 is placed in the out position 222, hydraulic fluid flows via line 232 from the second hydraulic switch 200 to a first port 234 provided in the hydraulic winch motor 156, thereby causing the motor 156 to turn the winch 30 in a direction to unwind the winch cable 32.

When the second hydraulic switch 220 is placed the in position 224, hydraulic fluid flows via line 236 from the second hydraulic switch 200 to a second port 238 provided in the hydraulic winch motor 156, thereby causing the motor 156 to turn the winch 30 in an opposite direction to rewind the cable 32 onto the winch 30.

As illustrated by the broken line 228, the hydraulic fluid from the second hydraulic switch 200 will, for the alternate embodiment of the device 10A, flow to a third hydraulic switch 230 which is identical to the second hydraulic switch 200 except that it operates a second winch motor 156A and a second winch 30A provided on the alternate device 10A.

Specifically, the third hydraulic switch 230 has a neutral position 220A, an out position 222A, and an in position 224A. In the neutral position 220A, hydraulic fluid flows via line 240 from the third hydraulic switch 230 back to point B' and then from there back to the hydraulic fluid tank 178. In the out position 222A, hydraulic fluid flows via line 242 from the third hydraulic switch 230 to a first port 244 provided in the second hydraulic winch motor 156A, thereby causing the second motor 156A to turn the second winch 30A in a direction to unwind the second winch cable 32A.

When the third hydraulic switch 230 is placed the in position 224A, hydraulic fluid flows via line 246 from the third hydraulic switch 230 to a second port 248 provided in the second hydraulic winch motor 156A, thereby causing the second motor 156A to turn the second winch 30A in an opposite direction to rewind the second cable 32A onto the winch 30A.

Although the device 10 and the alternate device 10A have been described herein as being hydraulic powered, the invention is not so limited. The present invention may be powered by any suitable means.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A combination vehicle positioning device and rollback wrecker vehicle for moving and positioning disabled vehicles into desired loading position comprising:
    a wrecker vehicle having a spring supported chassis and a rollback wrecker bed mounted on said chassis,
    means for attaching a stabilizing system and winching apparatus to a side frame of said wrecker vehicle,
    said stabilizing system having means for stabilizing said wrecker vehicle from horizontal and vertical movement while using the side winching apparatus, said stabilizing system retractable when not in use, and
    the winching apparatus attached to the side frame of said wrecker vehicle provided with cable and hook for moving disabled vehicles sideways into parallel position on a roadway shoulder for safe and convenient loading.

2. A combination according to claim 1 further comprising:
    a base plate secured to a side frame of said wrecker vehicle, and
    said stabilizing system and said winching apparatus secured to said base plate.

3. A combination according to claim 1 wherein the stabilizing system further comprises:
    at least one arm attached to the side frame, each said at least one arm extendable to engage a roadway, means for retracting each said at least one arm to a non-use position, a hydraulic cylinder attaching to each said at least one arm, and said rollback wrecker vehicle provided with a hydraulic system that supplies the hydraulic cylinder of each said at least one arm, each said at least one arm moving in conjunction with its associated hydraulic cylinder.

4. A combination according to claim 3 wherein the hydraulic means for extending and retracting said hydraulic cylinders further comprises:
    a first hydraulic switch connected to the hydraulic system provided on the wrecker vehicle, and hydraulic lines connecting said first switch to each said hydraulic cylinder to extend and retract each hydraulic cylinder.

5. A combination according to claim 4 further comprising:
    a second hydraulic switch connected to hydraulic lines provided on the wrecker vehicle, hydraulic lines connecting said second switch to a hydraulic motor, said hydraulic motor functionally attached to said winching apparatus so that said hydraulic motor unwinds and rewinds said cable onto said winch.

6. A combination according to claim 1 further comprising:
    a foot attached to a lower end of each said at least one arm, each said foot normally biased toward an underside of its associated arm so that a lower side of each foot engages the roadway when its associated arm is extended downward.

7. A combination according to claim 1 further comprising:
    at least one bumper block attached to each said at least one arm for engaging a striker plate provided on an upper side of its associated foot to move the foot upward to a rigid position when not in use.

8. A combination according to claim 1 further comprising:
    a cable roller guide provided on each side of said winching apparatus.

9. A combination according to claim 1 further comprising:
    a second winching apparatus secured to the side of the wrecker vehicle adjacent the first winching apparatus so that a second cable provided on the second winching apparatus unwinds in a direction approximately perpendicular to the longitudinal axis of the wrecker vehicle.

10. A combination according to claim 9 further comprising:
    a third hydraulic switch connected to hydraulic lines provided on the wrecker vehicle, hydraulic lines connecting said third switch to a second hydraulic motor, said second hydraulic motor functionally attached to said second winch so that said second hydraulic motor reversible causes a cable provided on said second winch to unwind and rewind onto said second winch.

11. A combination according to claim 10 further comprising:
    a cable roller guide provided on each side of each winching apparatus.

* * * * *